United States Patent [19]

Dirksmeier et al.

[11] Patent Number: 4,660,601

[45] Date of Patent: Apr. 28, 1987

[54] VALVE ARRANGEMENT

[75] Inventors: Ulrich Dirksmeier, Menden; Franz Kamp, Schwerte; Wilhelm Fringes, Menden, all of Fed. Rep. of Germany

[73] Assignee: R. & G. Schmoele Metallwerke GmbH & Co. KG, Menden, Fed. Rep. of Germany

[21] Appl. No.: 797,681

[22] Filed: Nov. 13, 1985

[30] Foreign Application Priority Data

Nov. 13, 1984 [DE] Fed. Rep. of Germany ....... 3441348

[51] Int. Cl.$^4$ .............................................. F16K 21/00
[52] U.S. Cl. .................................. 137/613; 137/505.35
[58] Field of Search .............. 137/613, 505.35, 505.41, 137/614.2, 614.19

[56] References Cited

U.S. PATENT DOCUMENTS

| 3,795,258 | 3/1974 | Iung | 137/613 |
| 3,885,589 | 5/1975 | Iung | 137/613 |
| 4,128,391 | 12/1978 | Braunstein | 137/613 |
| 4,462,424 | 7/1984 | Genbauffe et al. | 137/613 |

FOREIGN PATENT DOCUMENTS 0054717 10/1981 European Pat. Off. .

Primary Examiner—A. Michael Chambers
Attorney, Agent, or Firm—Michael J. Striker

[57] ABSTRACT

A valve arrangement for carrying over gas at reduced pressure from a pressure container filled with high pressure gas to a consumer device includes a pressure reducing valve having a spring-biased closing member, and an opening plunger connected to the closing member, a pressure-regulating valve including a pressure-regulating spring and an opening projection acting on the plunger, and a pressure container attachment. The pressure-reducing valve is formed as an integral component of an interchangeable valve cartridge inserted in the pressure container attachment.

5 Claims, 3 Drawing Figures

VALVE ARRANGEMENT

BACKGROUND OF THE INVENTION

The present invention relates to a valve arrangement for carrying over low pressure gases from a pressure container filled with high pressure gas to a consumer device.

A valve arrangement of the type under discussion has been disclosed, for example in EP No. 00 54 717. This arrangement has been utilized in households for drink automates for producing carbon-acid-containing drinks.

In the valve arrangement of the conventional type, a pressure-reducing valve is inserted immediately in a pressure container attachment simultaneously with a valve member. The pressure-reducing valve includes a piston-shaped closing member which slides in a bore of the valve member. The closing member at the side of the pressure container is loaded with a valve spring which is supported on the bottom of the valve member bore. An opening plunger is screwed in the closing member at the other side. The opening plunger is displaceable relative to the bolt forming a valve seat, the screw being threaded in the valve member. The conical end portion of the plunger extends in the closed position over the end face of that screw.

The pressure-regulating valve is formed as a diaphragm. The diaphragm forms a structural component of the two-part housing in which a lower pressure safety valve and a check valve are arranged radially opposite to each other. The housing of the pressure regulating valve can be plugged into the pressure container attachment. At the side of the pressure reducing valve, facing the opening plunger, an opening projection, extended in the axial direction of that plunger, is provided. That projection is connected with the diaphragm and follows the movements of the same.

A disadvantage of the above described conventional valve arrangement resides in that the pressure-reulating spring of the pressure-regulating valve must have a comparatively small diameter. Namely, the diameter of the spring disc lying inside the diaphragm is limited and therefore the diameter of the freely movable portion of the diaphragm does not exceed a non-realistic value. The small diameter of the spring leads, however, to a relatively large spring constant, whereby adjustability of the diaphragm-type pressure regulator is limited. This situation is further unfavorably affected by the fact that with a longer careless use of the valve arrangement the spring constant will change anyhow. Furthermore, the material of the diaphragm is very absorptive for $CO_2$. Consequently, it should be taken into consideration that depending on the time of action of $CO_2$ on the diaphragm the latter would swell and become thicker which would also eventually cause change in adjustability of the diaphragm.

A further disadvantage of the known valve arrangement is that the pressure-reducing valve receiving gas at high pressure from the pressure container requires a large gripping surface. Thus, in order to open the pressure-reducing valve a considerable force is required. The opening force must be even greater when the gas pressure increases due to temperature increase. It should be noted that the conventional valve arrangement is used in the temperature range at most between 15° C. and 40° C. and pressure in the pressure container at this temperature range can vary between about 40 and 140 bar. Due to this dependence of gas pressure upon temperatures the preciseness of the device during the cooperation of the pressure regulating valve with the opening plunger is reduced the stronger are fluctuations in temperatures at the location of the valve arrangement. The known valve arrangement functions well only when the temperature at its location is known and this temperature remains constant so that the pressure-regulating valve can be adjusted to this temperature.

SUMMARY OF THE INVENTION

It is an object of the present invention to provide an improved valve arrangement to be interconnected between a high pressure gas container and a consumer device for carrying over reduced pressure gas to said consumer device.

It is another object of the invention to provide a valve arrangement which would be applicable in a greater temperature range and greater pressure range of a gas, particularly $CO_2$.

These and other objects of the invetnion are attained by a valve arrangement for carrying over gas at reduced pressure from a pressure container filled with high pressure gas to a consumer device, comprising a pressure reducing valve including a closing member, a spring biasing said member, and an opening plunger connected to said closing member; a pressure-regulating valve including a pressure-regulating spring and an opening projection acting on said plunger; and a pressure container attachment, said pressure-reducing valve being formed as an interchangeable valve cartridge insertable in said attachment and including an annular sealing seat extended in the direction of the pressure container, said cartridge having a housing formed with said seat and supporting said closing member, said closing member being disc-shaped and being radially spaced in said housing, said housing having a stepped bore with a smaller portion extending in the direction of said pressure-regulating valve, said plunger being radially spaced in said housing and projecting through said portion outwardly from an end face of said housing a predetermined distance, said valve-reducing valve further including a sintered plug connected to said housing and supporting the spring of said pressure-reducing valve, said pressure-regulating valve further including a casing, a piston positioned in said casing, and a friction and wear-resistant piston seal for sealing said piston against said housing, the ratio of the outer diameter of said piston seal to the outer diameter of said pressure-regulating spring being 1:0.9.

The casing may have a passage for connecting said ball check valve said lower pressure safety valve and said lower pressure unloading valve to each other.

The chief advantage of the valve arrangement according to the invention resides basically in the fact that a piston-type pressure regulating valve is utilized in place of the diaphragm valve. The wear-resistant seal surrounding the piston practically eliminates friction of the piston in the valve housing as compared to the operation of the diaphragm-type valve. The diaphragm is also subject to substantial wear. The materials normally used for the diaphragms have very small resistance to $CO_2$. Due to a special piston sealing the spring of the pressure-regulating valve can have a substantially greater outer diameter as compared to that used with the diaphragm valve. The outer diameter of this spring is only insignificantly smaller than that of the piston seal. This is favorable for the valve because a small spring rate is obtained. The advantageous ratio between the spring force and the piston stroke with a small spring constant ensures very precise adjustment capabilities of the pressure-regulating valve. Ambient gas temperatures do not affect those adjustment capabilities. The disadvantages normally occurring due to $CO_2$-gas use do not occur any longer. The pressure-regulating spring can have a small pitch angle whereby with a longer use setting of the spring and after-regulating of the valve connected therewith are reduced to minimum.

The design of the pressure-reducing valve as a structural component of an interchangeable valve cartridge ensures precision of the valve arrangement and offers a unit which can be interchanged any time if worn out. The opening plunger of a relatively small mass ensures a distortion-free function. The projection of the free end of the plunger over the front or end face of the cartridge housing is precisely adjustable and this adjustment can be obtained at the pressure-setting of the valve, for example of 60 bar.

A further advantage of the valve arrangement of this invention is that temperature increase and pressure increase of gas only insignificantly affect opening forces of the pressure-regulating valve. Pressure-regulating qualities of the valve do not deteriorate with time. Said projection may be centered and press-fitted in said piston, whereby adjustability of the valve arrangement and the cooperation of the projection with the opening plunger would be further improved.

The pressure-regulating valve and the valve cartridge may be both accommodated in said attachment. Such an embodiment particularly ensures the connection of the device to a customary gas-bottle valve. Any additional devices can be selectively accommodated in the arrangement.

The valve arrangement may further include a ball check valve, a lower pressure safety valve and a lower pressure unloading valve having a pressure indicating pin all arranged in said casing, said attachment with said cartridge inserted therein being adapted to be plugged in said casing.

The above mentioned casing may have a passage for connecting the ball check valve, the lower pressure safety valve and the lower pressure unloading valve to each other. The pressure indication and protection against over pressure even with the closed check valve and disconnected pressure gas container are ensured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1B:
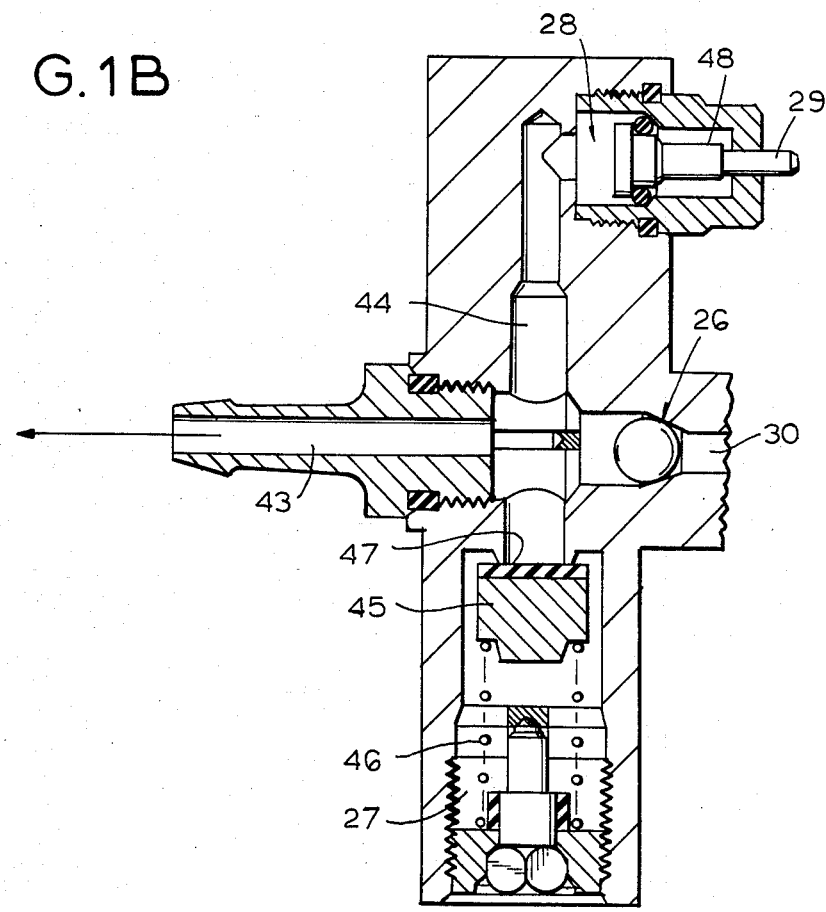
FIG. 1 is a sectional view, partially offset by 90°, of a valve for carrying over gas of low pressures from a pressure container filled with gas of high pressure to a consumer.

Referring now to the drawings in detail, and firstly to FIG. 1 thereof, it will be seen that the valve arrangement according to the invention and designated in total by reference numeral 1 can be connected, for example with a pressure container 2 which can be formed as a gas cylinder or bottle filled with $CO_2$ at high pressure.

The $CO_2$ gas serves, for example for producing carbon acid-containing drinks in household. For this purpose, pressure of $CO_2$ gas in the pressure container 2 is to be reduced to the level suitable for the operation of a consumer apparatus.

Figure 3:
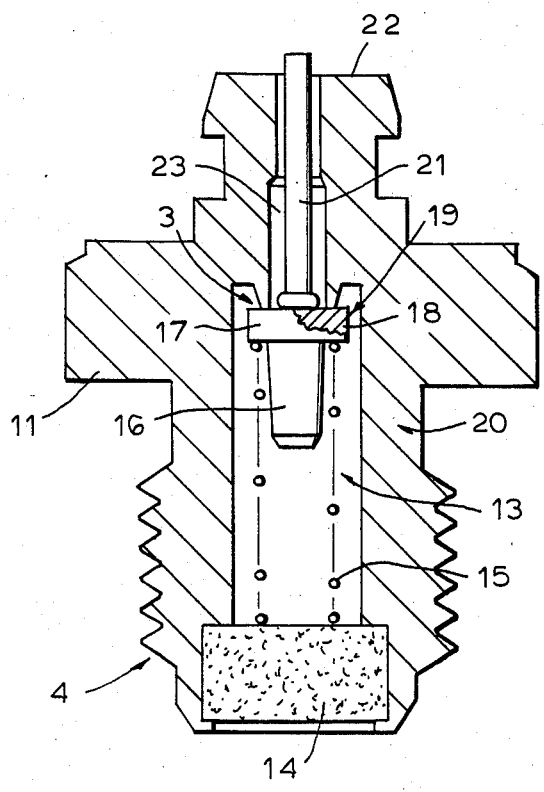
FIG. 3 is a sectional view, on an enlarged scale, of a valve cartridge with a pressure reducing valve, which is insertable in the valve arrangement of FIG. 1 or FIG. 2.

The valve arrangement 1 is comprised of a pressure reducing valve 3 which is formed as an integral component of a valve cartridge 4. The latter is illustrated on an enlarged scale in FIG. 3. As shown in FIG. 3, the valve cartridge 4 is a unit which is screwed into a pressure container attachment 5 shown in FIG. 1 and can be easily interchangeable. The pressure container attachment 5 is of an angular shape and has a conical threaded support or connection 6. The pressure container attachment 5 can be also formed as a substantially cylindrical straight-line component.

A safety disc 8 and a safety disc housing 7 accommodating that disc form a safety device operated as an over pressure safety. The safety disc 8 is secured in the attachment 5 by means of the housing 7. The latter in turn is screwed in a threaded bore 9 of the pressure container attachment 5. Bore 9 is in connection with an angular passage 10 provided in the attachment 5.

The pressure container attachment 5 has a recess 12 in the upper portion thereof, while the valve cartridge 4 has an annular flange 11 which is supported against the bottom of the recess 12. The valve cartridge 4 has a through stepped bore 13 as shown in FIG. 3. The end of the portion of the through bore of the greater diameter is closed with a sintered filter 14. The lower end of a valve spring 15 is supported against the sintered filter 14. The valve spring 15 in turn surrounds a pin-like projection 16 of a disc-shaped closing member 17 of the pressure reducing valve 3. The valve spring 15 urges the valve closing member 17 provided with a seal 18 against an annular sealing seat 19 of a housing 20 of the valve cartridge, which extends in the direction towards the sintered filter 14. The closing member 17 is radially spaced from the wall of the through bore 13. An opening plunger 21 is secured to the side of the closing member 17, facing away from the filter 14. Plunger 21 extends into the narrower portion of a step-wise bore 23 provided in the cartridge housing 20 in the direction of an end face 22 of that housing. As shown in FIG. 3, plunger 21 is radially spaced from the wall of the step-wise bore 23. The extension of the opening plunger 21 to the front or end face of housing 20 is exactly determined by grinding when the valve cartridge 4 is inserted into the pressure container attachment 5 and this attachment is screwed to the pressure container 2. The pressure reducing valve 3 is under pressure of, for example 60 bar.

With reference to FIG. 1 it will be seen that the pressure container attachment 5 is releasably coupled with a pressure-regulating valve 24. The pressure-regulating valve 24 is arranged in a housing 25, in which a ball check valve 26, a low pressure safety valve 27 and a low pressure-pressure unloading valve 28 with a pressure indicating pin 29 are also arranged. The housing portion accommodating the ball check valve 26 safety valve 27 and pressure unloading valve 28 is shown in FIG. 1 as offset by 90° relative to the housing portion which accommodates the pressure regulating valve 24. The connection between these two portions is provided by means of a passage 30.

The pressure-regulating valve 24 is formed as a piston regulator which has a substantially cylindrical housing 25 accommodating a piston 31 which is sealed against the inner periphery of housing 25 by means of a friction-and-wear-resistant sealing 32. The ratio between the outer diameter of the sealing 32 and the outer diameter of a pressure regulating spring 33, also accommodated in housing 25, is about 1:0.9. The upper end of spring 33 is supported against an adjustment washer 34 which is screwed in an open end 35 of the housing 25 while the lower end of spring 33 is supported against piston 31.

An opening projection 36 is press-fitted in the piston 31, which projection cooperates with the opening plunger 21. Projection 36 is engaged in a guide bore 37 provided in the housing 25.

Figure 2:
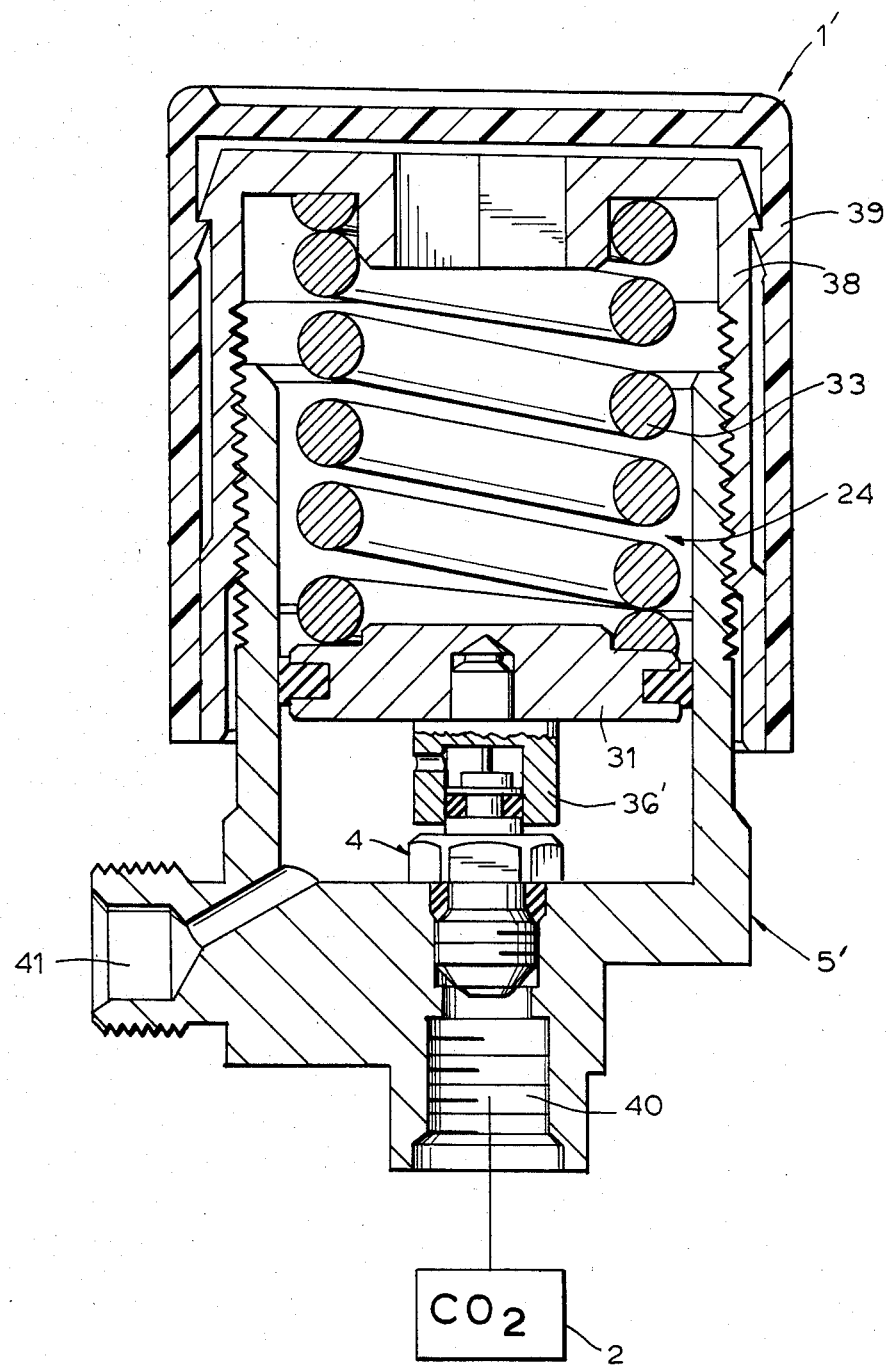
FIG. 2 is a sectional view of the valve of another embodiment of the invention.

Reference is now made to FIG. 2. In the embodiment of FIG. 2, the valve arrangement denoted in total by reference numeral 1' joins the pressure regulating valve 24 and the valve cartridge with the pressure reducing valve 3 into a single pressure container attachment 5'. The opening projection 36' connected with the pressure regulating piston 31 is in this embodiment shaped as a sleeve which is in engagement with the free end of the valve cartridge 4.

The insertion of the valve cartridge 4, regulating piston 31 and spring 33 takes place after the removal of an adjustment sleeve 38 which is closed by a protective hood 39. This protective hood is clamped to the adjustment sleeve 38. A threaded connection 40 of the pressure container attachment 5' serves for securing to the gas cylinder 2. A connection 41 leads to a consumer device. A ball check valve, a low pressure-safety valve and a low pressure-pressure unloading device with the aforementioned pressure indicating pin 29 can be additionally integrated in the attachment 5'.

The mode of operation of the valve arrangement of this invention is as follows:

For the removal of $CO_2$ gas from the pressure container, the housing 25 is connected with the pressure container attachment 5. The pressure-reducing valve 3 is closed. Opening projection 36 and the opening plunger 21 are not in contact with one another.

If now gas is to be received by a consumer device via a gas removal conduit 43 pressure in a piston chamber 42 (FIG. 1) is reduced. Depending on the adjustment force of the pressure-regulating spring 33 of the pressure-regulating valve 24 the opening plunger 21 displaces the opening projection 36 so that the pressure reducing valve opens and gas can flow therethrough. Thereby, the pressure indicating and pressure-unloading device 28, lower pressure safety valve 27 connected in the housing 25 by a passage 44 and also connected with the ball check valve 26 can be vented even when the ball check valve is closed and the pressure container is disconnected from the attachment and the pressure indicated as well as over pressure protection would be ensured.

If the highest allowed pressure in the system is exceeded the lower pressure safety unit reacts to it so that a closing member 45 is lifted from a seal seat 47 against a restoring force of a spring 46 and gas can flow away.

The pressure indicating pin 29 of the lower pressure safety device 28 indicates when the pressure container is empty. In this case, the pressure indicating pin 29 is displaced inwardly by the force of a spring 48 and becomes no longer visible.

The mode of operation of the embodiment of FIG. 2 corresponds to that of the valve arrangement of FIG. 1 with the distinction that the pressure container attachment 5 forms also the housing of the pressure regulating valve and is therefore immediately connected with the pressure container.

Thus, in order to make the valve arrangement 1, 1' operable in a greater temperature range and also in a greater pressure range the piston-type pressure regulating device with the friction and wear-resistant seal 32 and the pressure-reducing valve 3 incorporated in the interchangeable valve cartridge 4 form an integrated structural unit which provides that gas can be removed from the gas container under high pressure even if the gas container is a small bottle. Temperature fluctuations would not affect an opening force of the pressure-regulating valve 24, and adjustment properties of the whole device would be substantially improved.

It will be understood that each of the elements described above, or two or more together, may also find a useful application in other types of valve arrangements for carrying over gas from high pressure containers differing from the types described above.

While the invention has been illustrated and described as embodied in a valve arrangement for carrying over gas from a high pressure container to a low pressure gas consumer device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A valve arrangement for carrying over gas at reduced pressure from a pressure container filled with high pressure gas to a consumer device, comprising a pressure-reducing valve including a closing member, a spring biasing said member, and an opening plunger connected to said closing member; a pressure-regulating valve formed as a piston regulator and including a casing, a piston positioned in said casing, a pressure-regulating spring and an opening projection rigidly connected to said piston; and a pressure container attachment, said pressure-reducing valve being formed as an interchangeable valve cartridge insertable into and removable from said attachment and including an annular sealing seat extended in the direction of the pressure container, said cartridge having a housing formed with said seat and supporting said closing member, said closing member being disc-shaped and being radially spaced in said housing, said housing having a stepped bore with a smaller portion extending in the direction of said pressure-regulating valve, said plunger being radially spaced in said housing and projecting through said portion outwardly from an end face of said housing a predetermined distance whereby when said cartridge is inserted in said attachment said opening projection co-operates with said opening plunger, said pressure-reducing valve further including a sintered plug connected to said housing, said spring of said pressure-reducing valve being supported at one end thereof immediately against said plug, said pressure-regulating valve further including a friction and wear resistant piston seal for sealing said piston against said housing, the ratio of the outer diameter of said piston seal to the outer diameter of said pressure-regulating spring being 1:0.9.

2. The valve arrangement as defined in claim 1, wherein said projection is centered and press-fitted in said piston.

3. The valve arrangement as defined in claim 1, wherein said pressure-regulating valve and said valve cartridge are both accommodated in said attachment.

4. The valve arrangement as defined in claim 1, further including a ball check valve, a lower pressure safety valve and a lower pressure unloading valve having a pressure indicating pin all arranged in said casing, said attachment with said cartridge inserted therein being adapted to be plugged in said casing.

5. The valve arrangement as defined in claim 4, wherein said casing has a passage for connecting said ball check valve, said lower pressure safety valve and said lower pressure unloading valve to each other.

* * * * *